(12) United States Patent
Best et al.

(10) Patent No.: US 7,939,978 B2
(45) Date of Patent: May 10, 2011

(54) ELECTRIC MOTOR

(75) Inventors: Dieter Best, Ingelfingen (DE); Michael Sturm, Mergentheim-Rot (DE)

(73) Assignee: EBM-Papst Mulfingen GmbH & Co. KG, Mulfingen (DE)

( * ) Notice: Subject to any disclaimer, the term of this patent is extended or adjusted under 35 U.S.C. 154(b) by 203 days.

(21) Appl. No.: 12/237,506

(22) Filed: Sep. 25, 2008

(65) Prior Publication Data

US 2009/0079281 A1  Mar. 26, 2009

(30) Foreign Application Priority Data

Sep. 26, 2007  (EP) .................................. 07117242

(51) Int. Cl.
*H02K 11/00* (2006.01)
(52) U.S. Cl. ........................................................ 310/71
(58) Field of Classification Search ................ 310/71, 310/89
See application file for complete search history.

(56) References Cited

U.S. PATENT DOCUMENTS

| | | | |
|---|---|---|---|
| 6,204,583 B1 * | 3/2001 | Sasaki et al. ................... | 310/91 |
| 6,987,336 B2 * | 1/2006 | Streng et al. ................... | 310/51 |
| 7,211,914 B2 * | 5/2007 | Hofmann et al. ............... | 310/88 |
| 7,755,232 B2 * | 7/2010 | Winkler et al. ................. | 310/72 |
| 2006/0267431 A1 * | 11/2006 | Johnson et al. ................. | 310/89 |

FOREIGN PATENT DOCUMENTS

| | | |
|---|---|---|
| DE | 103 13 274 A1 | 3/2003 |
| DE | 103 32 392 A1 | 3/2004 |
| DE | 10 2005 015 318 A1 | 10/2006 |
| EP | 1059723 | 12/2000 |
| EP | 1104080 | 5/2001 |
| EP | 1237260 | 9/2002 |
| EP | 1419568 | 5/2004 |

* cited by examiner

*Primary Examiner* — Nguyen N Hanh
(74) *Attorney, Agent, or Firm* — Brinks Hofer Gilson & Lione (57) ABSTRACT

The present invention relates to an electric motor (1) with a stator (4) with a wiring device (28) for stator windings, with control electronics (10) arranged in an electronics housing (8) and a connecting device (32), which is arranged in the region of the electronics housing (8), for external connecting lines. In this case, all of the electrical connections between the connecting device (32) and the control electronics (10) and/or between the control electronics (10) and the stator wiring device (28) are in the form of a plug-type connector (34) with a number of connecting elements.

32 Claims, 6 Drawing Sheets

ELECTRIC MOTOR

CROSS REFERENCE TO RELATED APPLICATION

This application claims priority to European patent application number 07117242.3, filed Sep. 26, 2007.

FIELD OF THE INVENTION

The present invention relates to an electric motor with a stator with a wiring device for stator windings, with control electronics arranged in an electronics housing and a connecting device, which is arranged in the region of the electronics housing, for external connecting lines.

In addition, the invention also relates to specific individual components (as "replacement parts or accessories") of the electric motor which are essential to the invention.

BACKGROUND OF THE INVENTION

An electric motor is described, for example, in DE 103 13 274 A1 and the corresponding EP 1 419 568 B1. In this case the motor is specifically one which has a substantially closed or encapsulated motor housing having a high level of IP protection in accordance with DIN/IEC EN 60034-part 5, comprising a stator and an external rotor, which surrounds the stator from one side as part of a motor housing in the form of a pot, and an adjoining electronics housing as a further part of the motor housing on the side axially opposite the external rotor, which electronics housing contains control electronics. The motor housing is designed so as to be substantially closed or encapsulated, apart from an annular gap required for the rotation between the external rotor and the adjoining housing region, this annular gap being sealed off against the ingress of moisture and other contaminants via a rotary seal, generally in the form of a labyrinth seal. With the known motor, the electronics housing has an opening for electrical connection purposes, it being possible for this opening to be closed in a seal tight manner by means of a connecting plug-type connector, which is connected to external connecting lines. Within the electronics housing, corresponding opposing contacts are arranged in the region of the housing opening as the connecting device. The cited publications do not disclose anything about the nature of the internal electrical connections between the opposing contacts of the connecting device and the control electronics and between the control electronics and the stator or the wiring device thereof.

However, with such known motors it has until now been the case that fixedly connected, in particular soldered lines have been provided for all internal connections.

In this regard, reference is also made in supplementary fashion to the publication which was cited and whose contents were acknowledged in EP 1 419 586 B1: Ziehl Abegg's company brochure "The Intelligent Drive", EC Flyer p65 01/99. With the EC motor depicted therein, the internal line connections can clearly be identified.

Although such motors correspond to a high level of IP protection, under unfavorable operating conditions damp or even moisture can nevertheless enter the motor housing, to be precise primarily through the unavoidable annular gap between the external rotor and the adjoining housing region. Once moisture has entered here, it can propagate within the motor and result in damage.

SUMMARY OF THE INVENTION

The present invention is based on the object of providing an electric motor of the mentioned type which enables simplified manufacture and assembly and in particular also ensures further improved protection against dampness.

In this regard, the invention provides that all of the internal electrical connections between the connecting device and the control electronics and/or between the control electronics and the stator wiring arrangement are strictly in the form of plug-type connections, provided by a connector. The connections are aligned with respect to their plug-in and detachment direction, preferably corresponding to a motor axis or axially parallel thereto. This configuration according to the invention significantly simplifies the assembly of the motor by virtue of the components for the electrical connection only needing to be plugged together. In addition, the advantage is achieved that, even in an assembled state of the motor, i.e. when it has been installed fixed in position at a use location via its stator flange, it is possible to open the housing quickly, simply by withdrawing the electronics housing with the control electronics (once screw connections between the electronics housing and the stator flange have been detached). As a result, the electronics can be dismantled simply and quickly and also replaced, for example for the purpose of maintenance work.

A further advantageous configuration of the invention firstly provides that the plug-type connections of the connector between the connecting device and the control electronics pass through a wall of the electronics housing in such a way that they are sealed off. Secondly, the plug-type connections also between the control electronics and the stator wiring arrangement pass through a separating wall of the stator flange in such a way that they are sealed off. These internal seals effectively avoid a situation in which, in the case of the ingress of moisture at any point of the motor, in particular via the annular gap in the region between the rotor and the housing, this moisture is capable of propagating further within the motor, because in practice barriers are formed within the motor, and contact parts of the plug-type connections according to the invention are each passed through said barriers in such a way that they are sealed off.

A further essential aspect of the invention is the fact that the connecting device has a subcarrier, which bears connecting contacts for the external connecting lines and contact elements of the plug-type connector toward the control electronics, the subcarrier having, in the region of contact passage openings of the wall of the electronics housing, seals for bearing in sealing fashion against the wall in regions surrounding the passage openings. In an advantageous configuration, in this case the subcarrier is in the form of a box with a lower side having the contact elements and the seals and an opposite opening with a peripheral opening rim and has been inserted in this case from the outside into a matching receptacle of the electronics housing. Thus, the subcarrier forms a type of terminal box, whose opening can be closed by an external cover. This cover at the same time also closes the receptacle of the electronics housing by it engaging over the entire region of the subcarrier and being screwed directly to the electronics housing in external holding regions. Preferably, the cover is then substantially flush in the outer contour of the electronics housing, in particular in a housing end wall which is perpendicular to the motor axis.

In a further advantageous configuration, the connecting device or the subcarrier can have modular connecting modules which can optionally be fitted. These connecting modules can be in the form of a power module for connecting voltage supply lines, in the form of a control module for connecting external control lines and/or in the form of a relay module in particular with safety switching functions.

Further configurations and particular aspects of the invention will be explained in still greater detail in the subsequent description.

BRIEF DESCRIPTION OF THE DRAWINGS

The invention will be explained in more detail with reference to a preferred exemplary embodiment of a motor according to the invention illustrated in the drawing, in which.

DETAILED DESCRIPTION OF THE INVENTION

Throughout this description, identical parts have always been provided with the same reference symbols in the various figures in the drawing. For this reason, any description of a part with reference to a specific figure in the drawing also applies to other figures in which the part can likewise be seen with the corresponding reference symbol.

In the embodiment illustrated, an electric motor 1 according to the invention is in the form of a brush-less, electronically commutated DC external rotor motor. The electric motor 1 has an encapsulated motor housing 2 such that it satisfies a high level of IP protection in accordance with IEC 60034 5, for example IP 54.

Figure 1:
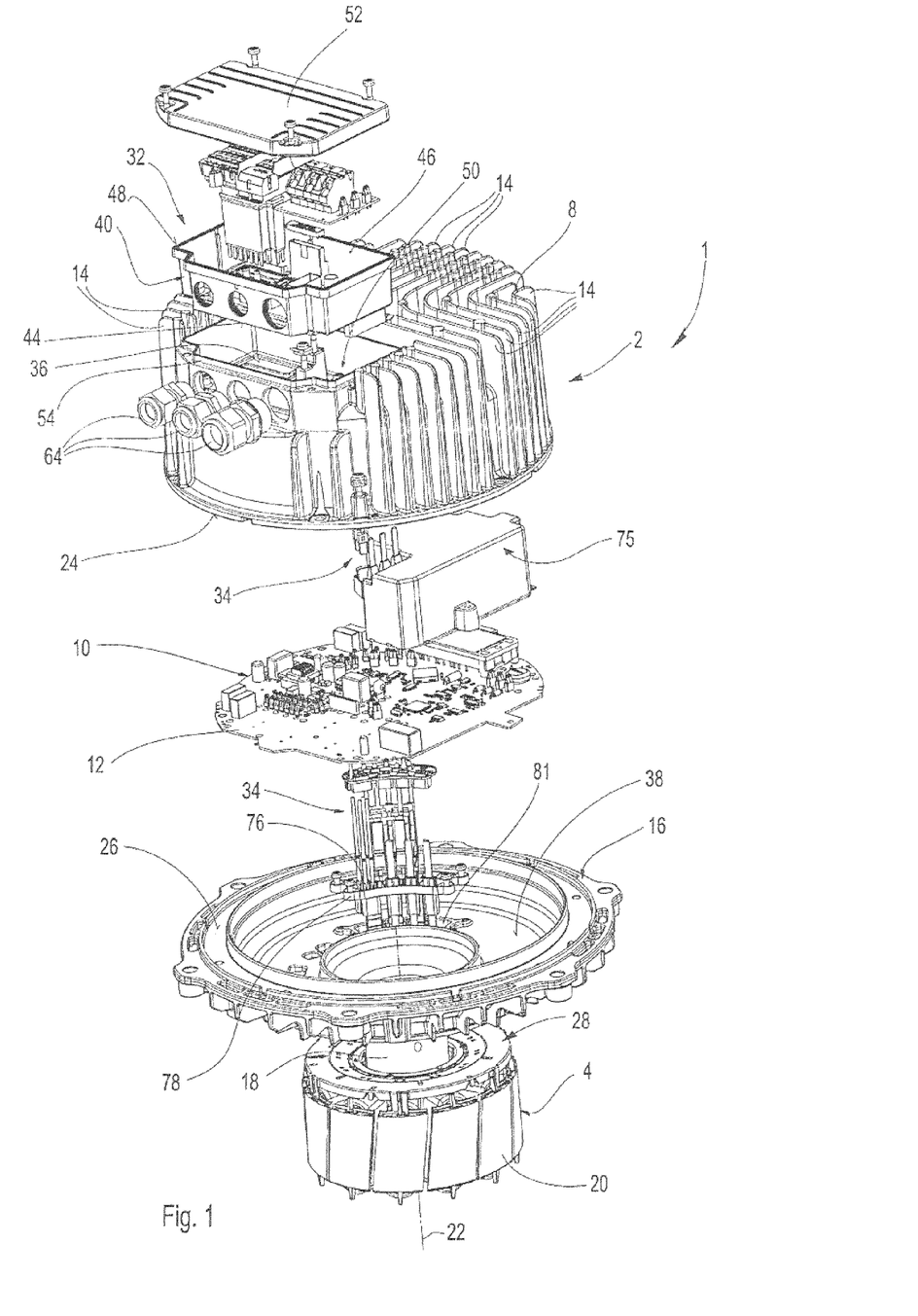
FIG. 1 shows a perspective exploded illustration of a motor according to the invention, but without an external rotor.
Figure 2:
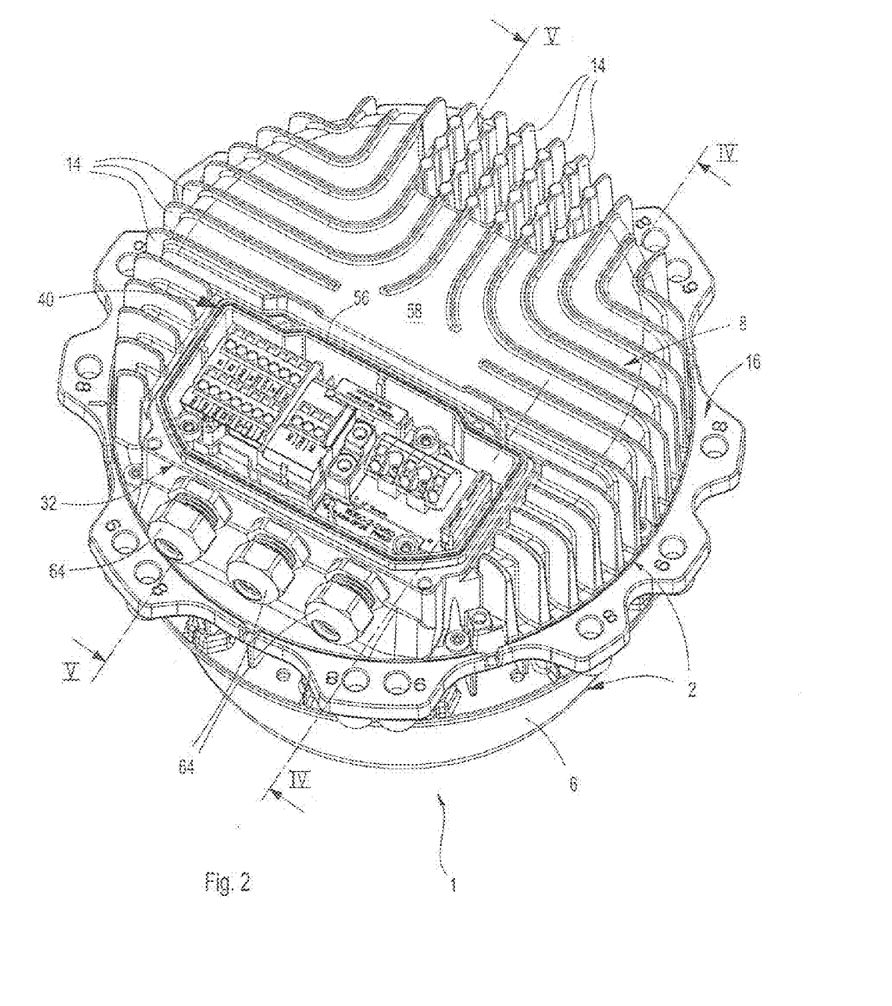
FIG. 2 shows a perspective view of the assembled motor shown in FIG. 1 with the external rotor, but without an upper cover in the connecting region.
Figure 3:
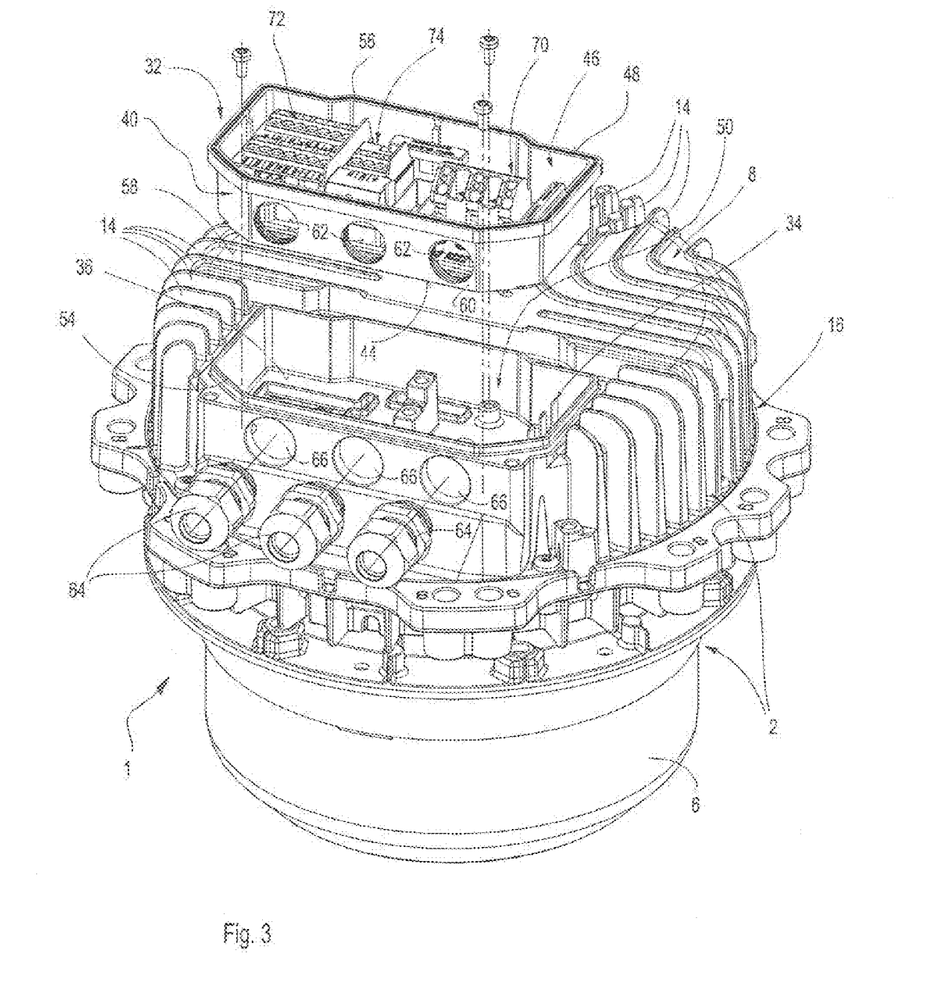
FIG. 3 shows a further perspective view similar to that in FIG. 2 with a partial exploded illustration of essential component parts of a connecting device.

As can be seen from FIGS. 1 to 3, the electric motor 1 comprises a stator 4 (see in this regard also FIG. 8) and an external rotor 6, which surrounds the stator 4 from one side as part of the motor housing 2 in the form of a pot. This external rotor 6 is only illustrated in FIGS. 2 and 3, but not in FIGS. 1 and 8. On that side of the stator 4 which is axially opposite the external rotor 6, there is an adjoining electronics housing 8 as a further part of the motor housing 2, with control electronics 10, which are required for the operation of the electric motor 1, being accommodated in said electronics housing 8. These control electronics 10 are substantially arranged on a printed circuit board 12 (FIG. 1). The electronics housing 8 is in the form of a pot in order to accommodate the control electronics 10. In this case, the electronics housing 8 is made from a highly thermally conductive material, in particular metal, and as a result at the same time also forms a heat sink for those component parts of the control electronics 10 which produce heat during operation. These component parts bear against the electronics housing 8 internally in good thermally conductive contact (see in this regard FIGS. 4 and 5). In addition, the electronics housing 8 has external cooling ribs 14. The control electronics 10 form, together with their electronics housing, a common assembly (electronics assembly) of the motor 1.

As the bearing part, the electric motor 1 furthermore has a stator flange 16, which is preferably formed integrally with a bearing support tube 18. The stator 4 comprises a laminate stack 20 with stator windings (not designated any further), the stator 4 having been pressed with its laminate stack 20 onto the bearing support tube 18. In this case, the bearing support tube 18 contains rotary bearings (not illustrated) for a shaft (likewise not shown) of the external rotor 6. The external rotor 6 is thus mounted rotatably about a motor axis 22. The stator 4 is therefore fastened on the stator flange 16 via the bearing support tube 18.

In addition, the electronics housing 8 is also fastened with a peripheral opening rim 24 on the stator flange 16, with a seal (not illustrated in the drawing) being arranged between the opening rim 24 and a peripheral, preferably groove-like sealing face 26 of the stator flange 16. As a result, the control electronics 10 are tightly encapsulated between the stator flange 16 and the electronics housing 8.

A gap (not shown in the drawing) formed between the rotating external rotor 6 and the stator flange 16 (likewise forming part of the motor housing 2) is sealed off against the ingress of moisture or other contaminants from the outside via a suitable rotary seal, which is in particular in the form of a labyrinth seal.

The stator 4 has a wiring device 28 for its stator windings (see FIGS. 1 and 8), this wiring device 28 comprising a switching disk 30, which is arranged in the region of an end-side winding head of the stator 4, covers the winding head and is used for electrically wiring the stator windings and for the electrical connection to the control electronics 10. In addition, the switching disk 30 preferably bears at least one so-called temperature controller or thermal cut-off (not shown in the drawing), which can be formed, for example, by an NTC element.

In addition, a connecting device 32 for external connecting lines (not illustrated) is provided in the region of the electronics housing 8.

Within the electric motor 1, firstly the connecting device 32 now needs to be electrically connected to the control electronics 10, and secondly the control electronics 10 also need to be electrically connected to the stator 4 or its wiring device 28.

The invention now provides that all of the electrical connections between the connecting device 32 and the control electronics 10, additionally or alternatively also all of the electrical connections between the control electronics 10 and the stator wiring device 28 are in the form of a plug-type connector 34 having connecting elements. Preferably, all of the connecting elements of plug-type connector 34 are aligned, with respect to their plug-in and detachment direction, corresponding to the motor axis 22 or axially parallel thereto. As a result, all of the components merely need to be plugged together in the axial direction to form the electrical connection.

Figure 4:
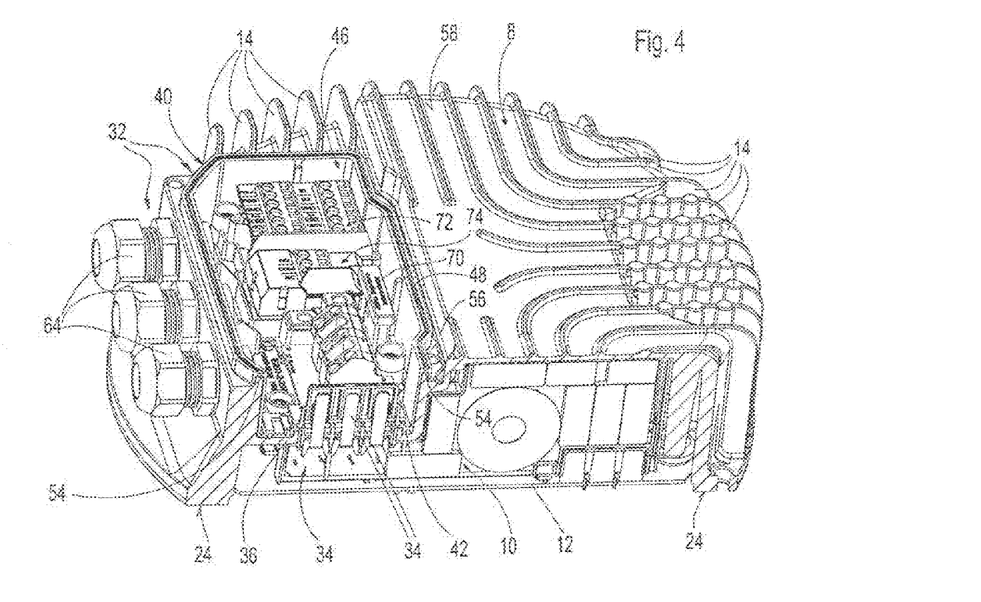
FIG. 4 shows a perspective sectional view of an electronics assembly in a sectional plane IV-IV in accordance with FIG. 2 which is parallel to the motor axis.
Figure 5:
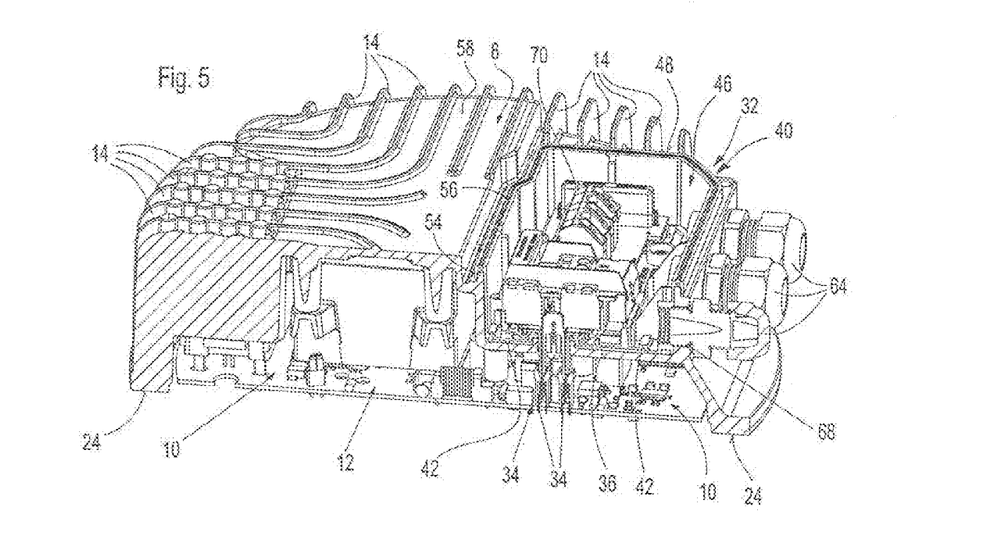
FIG. 5 shows a further sectional view similar to that in FIG. 4, but in the sectional plane V-V from FIG. 2.

As can be seen in particular in FIGS. 4 and 5, it is provided with respect to the connections between the connecting device 32 and the control electronics 10 that the connecting elements of plug-type connector 34 pass through a wall 36 of the electronics housing 8 in such a way that they are sealed off. Correspondingly, it is also provided with respect to the connections between the control electronics 10 and the stator wiring device 28 that the connecting elements associated plug-type connector 34 pass through a separating wall 38 of the stator flange 16 in such a way that they are sealed off. In this regard, particular reference is made to FIGS. 1 and 8.

In a specific aspect of the invention, the connecting device 32 has a subcarrier 40, which firstly bears connecting contacts (not designated in any more detail) for the external connecting lines and secondly contact elements (likewise not specifically designated) of the plug-type connections 34 toward the control electronics 10. In this case, the subcarrier 40 has, in the region of contact passage openings of the wall 36 of the electronics housing 8 (see FIGS. 4 and 5), seals 42, which each come to bear in sealing fashion against the wall 36, in regions surrounding the passage openings. In this way, the bushings of the plug-type connector 34 are sealed off.

Figure 6:
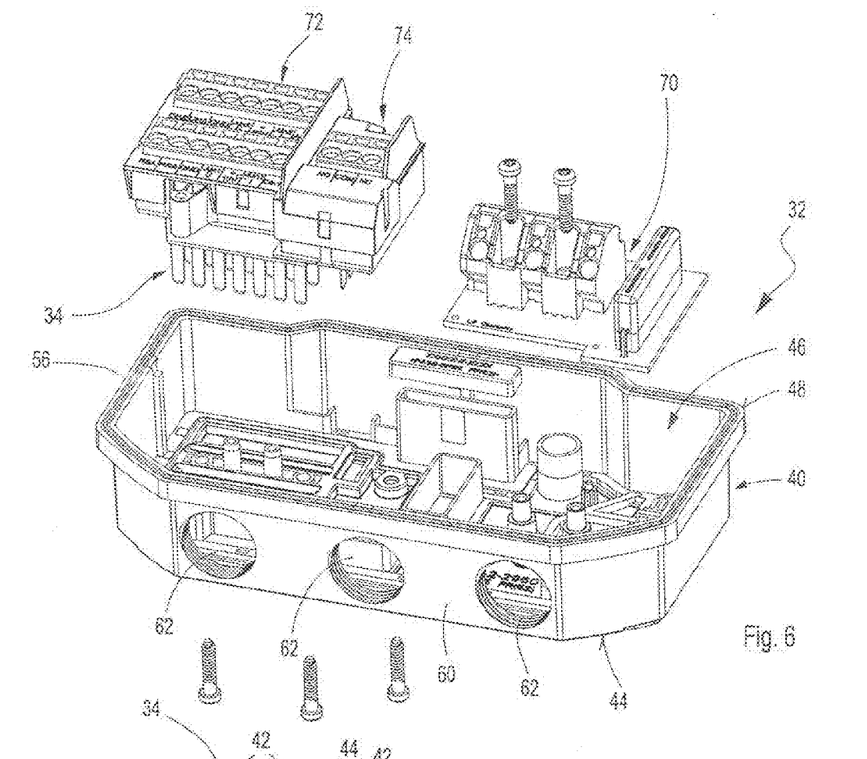
FIG. 6 shows a perspective exploded illustration of component parts of the connecting device.
Figure 7:
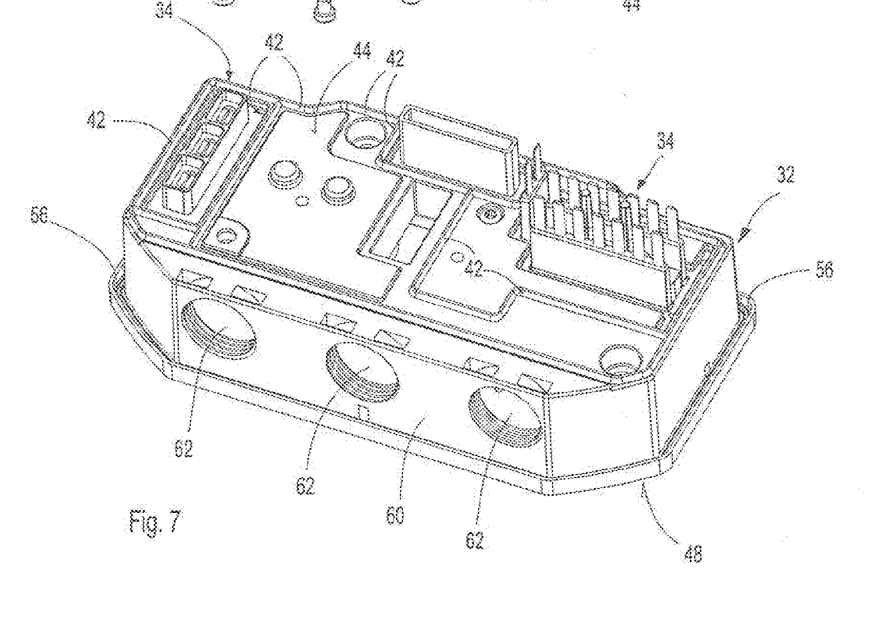
FIG. 7 shows the assembled parts shown in FIG. 6 in a perspective view of a lower side.

In a preferred configuration, the subcarrier 40 is in the form of a box or trough with a lower side 44 having the contact elements and the seals 42 and an opposite opening 46 with a peripheral opening rim 48. In this regard, particular reference is made to the separate illustrations in FIGS. 6 and 7. As shown in FIGS. 1 to 5, this box-shaped subcarrier 40 is inserted from the outside into a receptacle 50 (which is matched in terms of its shape and size) of the electronics housing 8. The receptacle 50 of the electronics housing 8 can be closed with an external cover 52, as shown in FIG. 1. In this case, it is preferably provided that the subcarrier 40 is bent back toward the outside in the region of its opening rim 48 and engages, with this bent-back opening rim 48, over a sealing web 54, which surrounds the receptacle 50 of the electronics housing 8, as can best be seen in FIGS. 4 and 5. In this case, a peripheral seal 56 is arranged in the region of the opening rim 48 in such a way that the cover 52 firstly closes the subcarrier 40 and secondly also the receptacle 50 of the electronics housing 8 on the outside in sealing fashion by virtue of the fact that the seal 56 of the subcarrier 40 is positioned in sealing fashion between the cover 52 and the sealing web 54 of the electronics housing 8. For this purpose, the cover 52 engages over the entire subcarrier 40 and is screwed directly to the electronics housing 8 in external holding regions. Preferably, the cover 52 is substantially flush in the outer contour of the electronics housing 8, to be precise in a housing end wall 58 which is perpendicular to the motor axis 22.

In this case, it is particularly advantageous if the subcarrier 40 and preferably also the cover 52 each comprise an electrically insulating plastic. As a result, good electrical insulation with respect to the electronics housing 8 made from metal is ensured in the region of the connecting device 32 and all of the live contacts. In a further preferred configuration, in this case the subcarrier 40 is in the form of a two-component molded part, with it being made from a first, dimensionally stable material and the seals 42 and 56 being integrally formed cohesively from a second, more elastic material with a linear profile.

The trough-shaped subcarrier 40 preferably has, in a side wall 60, a plurality of openings 62 (for example three as illustrated) for inserting the connecting lines (not illustrated). In this regard, reference is made to FIGS. 6 and 7. Each opening 62 is in the form of a threaded hole and is used for screwing a sealing screw connection 64 (see FIGS. 1 to 5), as is conventional for sealed-off cable bushings. The electronics housing 8 also has, in a side wall for each opening 62 of the subcarrier 40, an associated, aligning passage opening 66, in whose region the associated sealing screw connection 64 is sealed off from the outside via a seal 68. In this regard, particular reference is made to the section in FIG. 5.

In accordance with a further aspect of the invention, the connecting device 32 or the subcarrier 40 may have modular connecting modules which can optionally be fitted. As can be seen from FIGS. 3 to 6, these connecting modules may be embodied as a power module 70 for connecting voltage supply lines, a control module 72 for connecting external control lines and/or a relay module 74 in particular with specific safety switching functions. These modules firstly have the required contact elements for connecting the lines and secondly also the required plug-type contact elements for the plug-type connector 34.

In a further preferred configuration, as shown in FIG. 1, a separate interference suppression assembly 75 is provided between the connecting device 32, to be precise in particular the power module 70 thereof, and the control electronics 10, which interference suppression assembly 75 is likewise electrically connected on both sides via plug-type connections 34. Thus, the connecting device 32 is connected to the control electronics 10 partially indirectly via the interference suppression assembly 75. This assembly 75 contains conventional electrical interference suppression or filter component parts. Owing to the design as a separate assembly, an arrangement of these components parts on the printed circuit board 12 of the control electronics 10 is not required.

Figure 8:
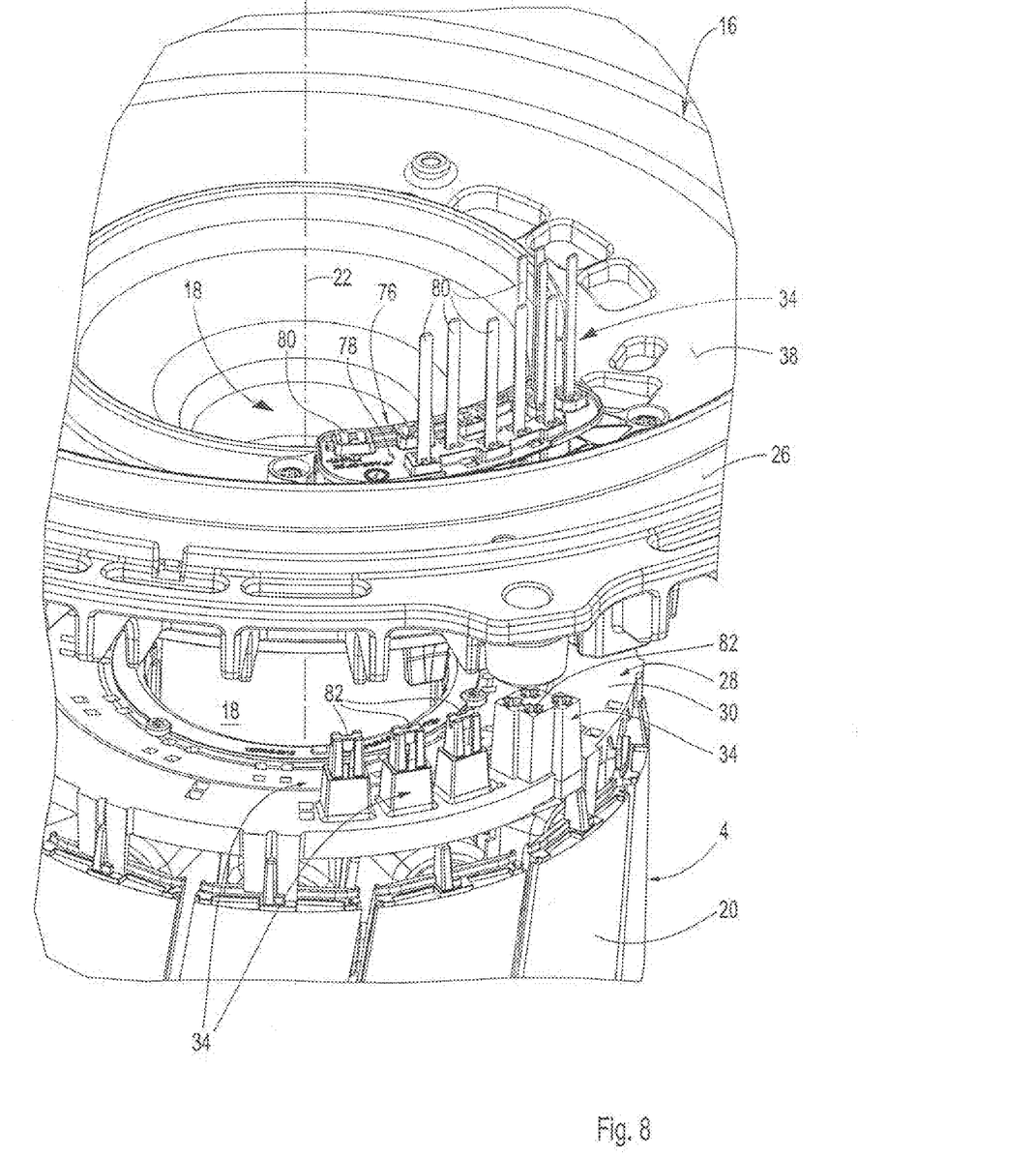
FIG. 8 shows a detail perspective view of a connection region of the stator or its wiring device in a state in which it is not yet assembled.

As far as the connections between the control electronics 10 and the stator wiring device 28 are concerned, an adaptor plug 76 is provided for these connecting elements of electrical plug-type connection 34 as shown in FIGS. 1 and 8. This adaptor plug 76 comprises a flange-like carrier part 78 with plug-type contact elements 80 held therein, the contact elements 80 passing through an opening 81 of the separating wall 38 of the stator flange 16 (see in particular FIG. 1), and the carrier part 78 covering the opening 81 and bearing against the separating wall 38 via a peripheral seal, which surrounds the opening 81, but is not illustrated in the drawing. The carrier part 78 is fastened on the separating wall 38, in particular screwed. In this way, these bushings are also sealed off in such a way that the two areas which adjoin one another via the separating wall 38 are separated from one another in sealing fashion.

Similarly to the subcarrier 40, the carrier part 78 preferably also is made from an electrically insulating plastic, in particular with a configuration as a two-component molded part, the seal being integrally formed cohesively from an elastic material with a linear profile.

As can furthermore also be seen from FIG. 8, the switching disk 30 bears appropriately shaped, corresponding contact elements 82 for the purpose of connecting the adaptor plug 76 in plug-type fashion.

Finally, mention is once again made of the fact that, in addition to the entire electric motor 1, protection is also claimed for the essential component parts, in particular the connecting subcarrier 40, the electronics housing 8, the control electronics 10 and the interference suppression assembly 75, to be precise in each case in the described, preferred configuration.

The invention is not restricted to the exemplary embodiments illustrated and described, but also includes all embodiments with the same effect within the meaning of the invention. Furthermore, the invention has until now also not been restricted to the combination of features defined herein.

While the above description constitutes the preferred embodiment of the present invention, it will be appreciated that the invention is susceptible to modification, variation, and change without departing from the proper scope and fair meaning of the accompanying claims.

The invention claimed is:

1. An electric motor comprising a stator with a wiring device for stator windings of the stator, with control electronics arranged in an electronics housing and a connecting device for external connecting lines, a plug-type connector means for providing electrical plug connections between the control electronics, and one or both of the connecting device and the wiring device, wherein the plug-type connector means providing electrical connections between the control electronics and the wiring device passes through a separating wall of a stator flange in such a way that the electrical connections are sealed off.

2. An electric motor according to claim 1, wherein the plug-type connector means defines a plug-in and detachment direction aligned with a motor axis or axially parallel thereto.

3. An electric motor according to claim 1, wherein the plug-type connector means providing electrical connection between the connecting device and the control electronics pass through a wall of the electronics housing and the plug-in connector sealing with the wall.

4. An electric motor according to claim 3, wherein the plug-type connector means providing electrical connection between the connecting device and the control electronics pass through a wall of the electronics housing and the plug-in connector sealing with the wall.

5. An electric motor according to claim 1, wherein a separate interference suppression assembly is connected by the plug-type connector means providing an electrical plug connection between the connecting device and the control electronics.

6. An electric motor according to claim 1, wherein the wiring device comprises a switching disk which is arranged in the region of an end-side winding head of the stator.

7. An electric motor according to claim 1, wherein the control electronics are substantially arranged on a printed circuit board, which is positioned in a plane aligned transversely and perpendicular, with respect to the motor axis.

8. An electric motor comprising a stator with a wiring device for stator windings of the stator, with control electronics arranged in an electronics housing and a connecting device for external connecting lines, a plug-type connector means for providing electrical plug connections between the control electronics, and one or both of the connecting device and the wiring device, wherein the connecting device has a subcarrier which forms connecting contacts for the external connecting lines and contact elements of the plug-type connector toward the control electronics, the subcarrier having, in the region of contact passage openings of a wall of the electronics housing, seals for bearing in sealing fashion against the wall in regions surrounding the passage openings.

9. An electric motor according to claim 8, wherein the subcarrier is in the form of a box with a lower side having the contact elements and the seals and an opposite opening with a peripheral opening rim inserted from the outside into a matching receptacle of the electronics housing.

10. An electric motor according to claim 9, wherein the receptacle of the electronics housing is closed by an external cover, the subcarrier engaging with an opening rim, over a sealing web, which surrounds the receptacle of the electronics housing and has, in the region of the opening rim, a peripheral seal which the cover closes in a sealing fashion the subcarrier and also the receptacle of the electronics housing.

11. An electric motor according to claim 9, wherein the subcarrier has, in a side wall, one or more connecting line openings for the connecting lines.

12. An electric motor according to claim 11, wherein the one or more connecting line openings is in the form of a threaded hole for screwing in a sealing screw connection, the electronics housing having, for the one or more connecting line openings, an associated passage opening, in whose region the sealing screw connection is sealed off from the outside via the seals.

13. An electric motor according to claim 8, wherein the subcarrier is made from an electrically insulating plastic and is in the form of a multi-component molded part, the seals being formed cohesively from an elastic material.

14. An electric motor according to claim 8, wherein the connecting device has modular connecting modules which can optionally be fitted.

15. An electric motor according to claim 8, wherein the plug-type connector means defines a plug-in and detachment direction aligned with a motor axis or axially parallel thereto.

16. An electric motor according to claim 8, wherein a separate interference suppression assembly is connected by the plug-type connector means providing an electrical plug connection between the connecting device and the control electronics.

17. An electric motor according to claim 8, wherein the wiring device comprises a switching disk which is arranged in the region of an end-side winding head of the stator.

18. An electric motor according to claim 8, wherein the control electronics are substantially arranged on a printed circuit board, which is positioned in a plane aligned transversely and perpendicular, with respect to the motor axis.

19. An electric motor comprising a stator with a wiring device for stator windings of the stator, with control electronics arranged in an electronics housing and a connecting device for external connecting lines, a plug-type connector means for providing electrical plug connections between the control electronics, and one or both of the connecting device and the stator wiring device, wherein an adaptor plug is provided for the plug-type connector means providing electrical plug connection between the control electronics and the stator wiring device, the adaptor plug in the form of a flange-like carrier part with contact elements held therein, the contact elements passing through an opening of a separating wall of the stator flange, and the carrier part being fastened on the separating wall so as to bear against the separating wall covering the opening and having a peripheral seal surrounding the opening.

20. An electric motor according to claim 19, wherein the carrier part is made from an electrically insulating plastic and is in the form of a multi-component molded part, the seal being integrally formed cohesively from an elastic material.

21. An electric motor according to claim 19, wherein the plug-type connector means defines a plug-in and detachment direction aligned with a motor axis or axially parallel thereto.

22. An electric motor according to claim 19, wherein the plug-type connector means providing electrical connection between the connecting device and the control electronics pass through a wall of the electronics housing and the plug-in connector sealing with the wall.

23. An electric motor according to claim 19, wherein a separate interference suppression assembly is connected by the plug-type connector means providing an electrical plug connection between the connecting device and the control electronics.

24. An electric motor according to claim 19, wherein the wiring device comprises a switching disk which is arranged in the region of an end-side winding head of the stator.

25. An electric motor according to claim 19, wherein the control electronics are substantially arranged on a printed circuit board, which is positioned in a plane aligned transversely and perpendicular, with respect to the motor axis.

26. A connecting subcarrier for an electric motor comprising a stator with a wiring device for stator windings of the stator, with control electronics arranged in an electronics housing and a connecting device for external connecting lines, a plug-type connector means for providing electrical plug connections between the control electronics and one or both of the connecting device and the wiring device, the subcarrier having connecting contacts for the external connecting lines and contact elements of the plug-type connector means, the subcarrier having, in the region of contact passage openings of a wall of the electronics housing, seals for bearing in sealing fashion against the wall in regions surrounding the passage openings.

27. A connecting subcarrier for an electric motor according to claim 26, wherein the subcarrier is in the form of a box with a lower side having the contact elements and the seals and an opposite opening with a peripheral opening rim inserted from the outside into a matching receptacle of the electronics housing.

28. A connecting subcarrier for an electric motor according to claim 27, wherein the receptacle of the electronics housing is closed by an external cover, the subcarrier engaging with the opening rim, over a sealing web, which surrounds the receptacle of the electronics housing and has, in the region of the opening rim, a peripheral seal with the cover closing in a sealing fashion the subcarrier and also the receptacle of the electronics housing.

29. A connecting subcarrier for an electric motor according to claim 27, wherein the subcarrier has, in a side wall, one or more connecting line openings for the connecting lines.

30. A connecting subcarrier for an electric motor according to claim 29, wherein the one or more connecting line openings is in the form of a threaded hole for screwing in a sealing screw connection, the electronics housing having, for the one or more connecting line openings, an associated passage opening, in whose region the sealing screw connection is sealed off from the outside via a screw connection seal.

31. A connecting subcarrier for an electric motor according to claim 26, wherein the subcarrier is made from an electrically insulating plastic and is in the form of a multi-component molded part, the seals being formed cohesively from an elastic material.

32. A connecting subcarrier for an electric motor according to claim 26, wherein the connecting device has modular connecting modules which can optionally be fitted thereto.

* * * * *